United States Patent
Wils et al.

(10) Patent No.: US 6,570,881 B1
(45) Date of Patent: May 27, 2003

(54) HIGH-SPEED TRUNK CLUSTER RELIABLE LOAD SHARING SYSTEM USING TEMPORARY PORT DOWN

(75) Inventors: Joris Johannes Maria Wils, Acton, MA (US); James Scott Hiscock, Rockport, MA (US); Edward A. Heiner, Jr., Londonderry, NH (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/234,534

(22) Filed: Jan. 21, 1999

(51) Int. Cl.[7] .............................................. H04L 12/28
(52) U.S. Cl. ..................... 370/410; 370/225; 370/244
(58) Field of Search ................................ 370/389, 400, 370/406, 407, 408, 410, 386, 387, 388, 225, 228, 242, 244

(56) References Cited

U.S. PATENT DOCUMENTS

| | | | |
|---|---|---|---|
| 5,088,091 A | * 2/1992 | Schroeder et al. | 340/825.02 |
| 5,138,615 A | * 8/1992 | Lamport et al. | 370/400 |
| 5,260,945 A | * 11/1993 | Rodeheffer | 714/4 |
| 6,041,057 A | * 3/2000 | Stone | 370/255 |

* cited by examiner

*Primary Examiner*—David Vincent
*Assistant Examiner*—Bob A. Phunkulh
(74) *Attorney, Agent, or Firm*—McGlew and Tuttle, P.C.

(57) ABSTRACT

A packet based high-speed communications mesh is disclosed including a plurality of switches trunked network interfaces including links connecting the switches to form a trunk cluster. Edge devices are connected to the trunk cluster via trunked links. The trunked links provide a physical connection form each switch to each edge device. A configuration protocol is used for configuring the trunk cluster by eliminating links connected to a switch upon loss of connectivity to a switch. The protocol includes trunk configuration protocol packets transmitted by the edge devices. A trunk switch agent associated with each switch receives and transmits all trunking protocol packets for the associated switch and builds up an identifier list upon monitoring trunk configuration protocol packets. The agent monitors link status and accesses the list. The agent issues a requests to bring down all links to edge devices on a trunk switch for removal of the trunk switch upon all links to a particular edge device being lost and another trunk switch of a trunk cluster having at least one link to the particular edge device. Edge devices stop transmitting to the trunk switch upon receiving link down indications from link control hardware.

10 Claims, 3 Drawing Sheets

HIGH-SPEED TRUNK CLUSTER RELIABLE LOAD SHARING SYSTEM USING TEMPORARY PORT DOWN

FIELD OF THE INVENTION

The invention relates generally to network systems, such as local area networks (LANs) with structures and systems providing high availability interfaces. More particularly, the invention relates to packet based high-speed meshes constructed with a set of loosely coupled switches, optionally a configuration protocol, trunk network interfaces and optionally a reachability protocol wherein each switch provides a single shared LAN by interconnecting two or more links.

BACKGROUND OF THE INVENTION

Systems are known which provide redundant capabilities. Redundant packet forwarding devices have been used to handle the possibility of failed links and/or failed packet forwarding devices. Such packet forwarding devices have been used with protocols which protect available paths and are used for rerouting traffic.

Traditionally the spanning tree protocol has been use to provide both Layer 1 and 2 redundancy, in switch networks, by configuring alternate paths. When a link or switch element fails, a backup link is activated. The Spanning Tree algorithm defines the active and backup links in the topology. Spanning Tree is designed to control the many switches of the topology and has a slow (in the tens of seconds) reconfiguration time.

The reconfiguration time of Spanning Tree is a significant disadvantage. As network systems become more complex and handle additional traffic, the reconfiguration time becomes increasingly problematic. Further, spanning tree disables the redundant path. This negates the possibility of using redundant paths for increases in throughput.

Packet based high-speed meshes called trunk clusters offer a significant benefit as to providing redundancy and switch network systems as well as providing load sharing capabilities using multiple switches which provide additional switch throughput for each additional switch provided in the switch cluster or trunk cluster. Multiple switches forming a single logical switch provide layer 1 and layer 2 redundancy and switch network systems which avoid the use of spanning tree. These systems are based on multiple switches forming a single logical switch that can participate in topology control protocols (e.g. spanning tree and Trunk Cluster Management Protocol (TCMP)) and can share MAC address learning information.

U.S. application Ser. No. 09/014,548 filed Jan. 28, 1998, now U.S. Pat. No. 6,195,351 (which is hereby incorporated by reference) provides a Logical Switch Set (LSS) formed of two or more switches that act as a single packet forwarding device with specific connection rules. The LSS may be used as either a redundant switch set (RSS)or as a Load Sharing Switch Set (LSSS). The maximum throughput of the LSSS increases with each additional switch. A LSSS can only interconnect with the other devices via trunked links that contain at least one physical connection to each switch. This prevents any single link attachments to the LSSS. This also implies that if a link is lost, leaving no remaining links to that switch, then the LSSS can either chose to drop service to that station or stop using that switch for load sharing for all connected devices. Effectively removing that switch from the LSSS.

The LSS implements a single logical device, which is comprised of two or more separate switches. This logical device can operate as a simple packet forwarding device, a full function fully manageable switch, or any variation between these extremes. The simplest non filtering packet forwarding device need not share any state information between devices. A full function fully manageable switch model requires that state or parameter changes, acquired from the traffic streams a switch receives, be shared between the other switches. State and parameter changes can occur from learning MAC source addresses and processing management and control frames. Management and control frames destined for the logical device will be directed to one of the switches by the traffic steering algorithm of an attached device. Each switch in the LSS implements one or more of the physical links, within a trunked group, for each of the ports of the logical device. Each switch must have a unified view of the logical switch and port parameters to properly forward traffic and to transmit management and control frames. This sharing of state information requires a communication path between switches in a LSS. This communication path may be a dedicated resource or travel in band.

U.S. application Ser. No. 09/014,547 of Jan. 28, 1998, now U.S. Pat. No. 6,195,349, discloses a grouping of switch elements (Application Ser. No. 09/014,547 of Jan. 28, 1998 is hereby incorporated by reference) which is referred to herein as a trunk cluster. The trunk cluster cooperates with edge devices to provide a scalable logical LAN. The trunk cluster is constructed with a set of loosely coupled switches, a configuration protocol, trunked network interfaces, and optionally a reachability protocol.

Each switch in the trunk cluster provides a single "shared LAN" by interconnecting two or more links. The edge devices attached to the links run a trunk configuration protocol. These attached edge devices aggregate two or more physical ports into a trunked port. The devices view each trunked port as if the attached device is connected to a shared logical LAN with multiple other attached devices.

This logical LAN is designed to provide scaleability and resilience. The set of devices that interconnect to a logical LAN, called Edge devices, cooperate using configuration protocols and traffic steering methods required by the logical LAN. The trunk cluster is comprised of two or more trunk switches. A single logical LAN is provided with the edge devices splitting the traffic (directing traffic flow) across the links in a trunked port. Each trunk switch provides a separate path within the trunk cluster (multiple parallel paths are provided). The two or more separate paths between edge devices allow this logical LAN to increase bandwidth by adding more trunk switches and automatically decrease bandwidth in the event of a link failure and/or in the event of a trunk switch failure.

As each switch only provides a "shared LAN" that carries only part of the traffic between edge devices, each switch does not need to and must not participate in any topology control or discovery protocol. Spanning tree, TCMP, IGMP, and GARP packets are flooded. Unicast MAC (Media Access Controller) source addresses are learned and used to intelligently forward/filter unicast packets to minimize flooding within the "shared LAN" and increase throughput. The maximum throughput of the Trunk Cluster increases with each additional switch.

Each MAC device of an edge device may transmit a hello signal to MAC devices of other edge devices as part of a trunk configuration protocol. Such a configuration protocol configures the connections or link connections between the switches and the edge devices and also preferably continuously verifies the links status. The hello signal includes a trunk or edge device ID identifying the respective edge device of the MAC device transmitting the hello signal. Each MAC device records the edge device ID's of the hello signals received from other edge devices. These recorded edge device ID's are formed into an hello list for each MAC device. The TCMP agent of an edge device forms a trunk list for each other edge device. Each trunk list for a particular other edge device includes MAC addresses of the present edge device which received the hello signals from the respective one of the other edge devices. For example, if edge device A had three MAC devices which received hello signals from edge device B, edge device A would have a trunk list for edge device B which contained those three MAC devices. When edge device A received traffic for edge device B, edge device A would divide the traffic among the three MAC devices in the trunk list for edge device B. This dividing of traffic received by edge device A for edge device B, is according to the standard trunking convention known as "link aggregation". In this way, trunking can be accomplished through a plurality of switches in a mesh instead of just over a plurality of links where all the links start and stop at the same nodes. Also the trunking of the present invention allows links to be active and to increase data rates, where previously those links would have been inactive due a redundancy decision by a spanning tree algorithm.

As indicated in U.S. application Ser. No. 09/060,606 of Apr. 15, 1998, now U.S. Pat. No. 6,058,116, a logical LAN interconnection system may be provided based on two or more interconnected trunk clusters. U.S. application Ser. No. 09/060,606 of Apr. 15, 1998 is hereby incorporated by reference. Trunk connections are provided between each switch of one trunk cluster to each switch of another trunk cluster.

Basic Trunking requires at that each switch in the Trunk Cluster has at least one physical connection to each edge device attached to the Trunk Cluster. This prevents any edge device from being attached to a subset of trunk switches. This is referred to as "equal connectivity". When an edge device loses direct connectivity to a particular trunk switch thus leaving no remaining links to a that switch, but maintains connectivity to a remaining subset of trunk switches, then the trunk configuration protocol will eliminate the links of all edge devices to that particular switch. Effectively removing that switch from Trunk Cluster. The subset of trunk switches remains in the Trunk Cluster.

When an edge devices loses all its connections to all Trunk Switches, then each remaining edge device may be connected to each trunk switch. Equal connectivity is also created if an edge device regains one or more links to each trunk switch. In either case the trunk configuration protocol will attempt to restore the links of these remaining edge devices to effectively adding removed trunk switches back into the Trunk Cluster.

As described each switch in the trunk cluster provides a single shared LAN by interconnecting two or more links and the edge devices attached to the links run a trunk configuration protocol. These attached edge devices view each physical link within a trunked port as if the attached device is connected to a shared logical LAN with multiple other attached devices.

If the Trunk Cluster only supports Basic Trunking, then network disruption can be minimized if the trunk configuration can remove a Trunk Switch from the configuration quickly after a failure of direct connectivity to an edge device. The trunk configuration protocol is inherently slow, because it relies on hello message timeouts to detect a failure.

SUMMARY AND OBJECTS OF THE INVENTION

It is a primary object of the invention to provide a system, referred to herein generally as Port Blipping, which system is much quicker in removing a Trunk Switch from a trunk cluster configuration quickly after a failure of direct connectivity to an edge device.

According to the invention a packet based high-speed communications mesh is provided with a reliable loadsharing system. The mesh with reliable loadsharing system includes a plurality of switches with trunked network interfaces connecting the switches to form a trunk cluster. Edge devices are connected to the trunk cluster via trunked links. The trunked links provide a physical connection from each switch to each edge device. A configuration protocol is also provided for configuring the trunk cluster by eliminating links connected to a switch upon loss of connectivity to the switch. The protocol includes trunk configuration protocol packets transmitted by the edge devices. An identifier list is associated with each switch. This list is built up upon monitoring trunk configuration protocol packets. A trunk switch agent is associated with each switch for receiving and transmitting all trunking protocol packets for the associated switch, accessing said list and issuing a requests to bring down all links on a trunk switch for removal and monitoring link status.

A further object of the invention is to provide a system, which causes the edge devices of a trunk cluster to quickly limit themselves to using only those trunk switches that are usable if one becomes unusable. In a healthy case all trunk switches in the trunk cluster are in use. There is no "standby" device. This is referred to herein as "reliable load sharing".

Such a reliable load sharing system is much faster than the trunk configuration management protocol (TCMP) because it relies on high-speed link down indications from link control hardware. Each Trunk Switch maintains a list of identifiers that uniquely identifies each edge device that is connected to it. The identifier is called the Trunked Port Identifier (TPI). The trunk switch agent builds this list up by monitoring the trunk configuration protocol packets that are transmitted by the edge devices. The list provides a map of each TPI to the link of the switch.

A further feature of the invention includes providing a process, which temporarily brings down (referred to herein as "blips") all links to edge devices on a trunk switch when it is necessary to remove the trunk switch from the trunk cluster. The switch over upon failure system determines that the trunk switch should be removed only when the trunk switch loses all its links to a particular edge device AND at least one other trunk switch in the trunk cluster still has at least one link to the edge device in question. The process signals that the edge device is to stop sending to the trunk switch in question, namely the trunk switch that does not have a connectivity to all other edge devices. The quick response minimizes the time that packets can be "blackhold" namely sent to a non-operating switch resulting in the packets not reaching their destination. The system also makes sure that the ports are not blipped (namely temporarily brought down) if both trunk switches lose all their links to an edge device within a short time window of each other.

The process involves the agent monitoring link status for detecting the occurrence of a link down event When a link down event occurs the switch agent updates the trunk port MD to the link mapping table (namely indicating the failure for the particular trunk port ID and link). The switch agent then looks to the TPI to link map to see inhere are any remaining links to that TPI. If there are no more links remaining and there has been no timer set for the particular trunk port the agent sends a message into the other trunk switch (or trunk switches) of the trunk cluster indicating the lost trunk port. The agent also posts a timer (starts a timing procedure) during which it waits for the status of links to the trunked port ID'd from the other trunk switches of the trunk cluster. At the other trunked switches, when a lost trunked port ID message is received the agent at the other switch responds with the status for the lost trunk port, which has been identified. If, at the other switches, the switch agent has posted a timer (started a timing procedure) for the particular trunked port which has been identified, the posted timer is cancelled. Back at the original switch, when the timer for the particular trunk port has expired, the agent determines whether a lost trunked port ID response has been received This determines whether the other switches still have connectivity to the particular trunked port. If they do still have connectivity, a procedure to blip the port (also referred to as blip ports off) is initiated. This procedure involves setting a timer and for each link, turning the link off. The link monitoring hardware on each edge device quickly detects the disabled link which signals the edge devices to stop sending to the trunk switch that does not have the connectivity to all other edge devices. When the blip port off timer has expired a blip port on procedure is run wherein each link is turned on. The trunk configuration protocol will restore the trunk switch to the trunk cluster once equal connectivity is regained.

The invention further provides the capability of trunk clusters, namely a cluster of switches as discussed above which have trunk connections, being connected to aggregate links. Specifically, IEEE proposals for developing a new standard for trunking is referred to as link aggregation. The invention provides the possibility of link aggregation, namely a connection between trunks and aggregate links.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
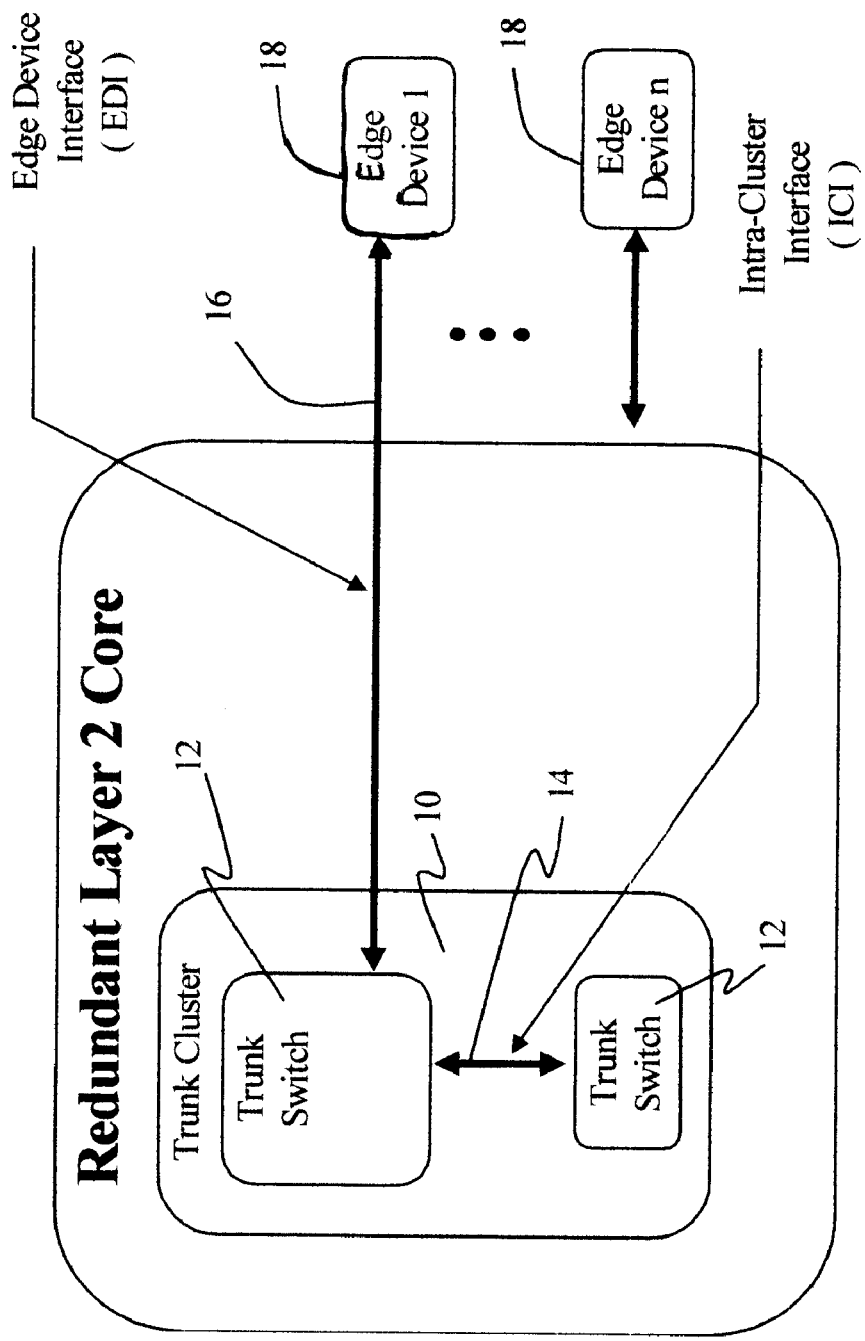
FIG. 1 is a schematic diagram showing a trunk cluster with connected edge devices.
Figure 2:
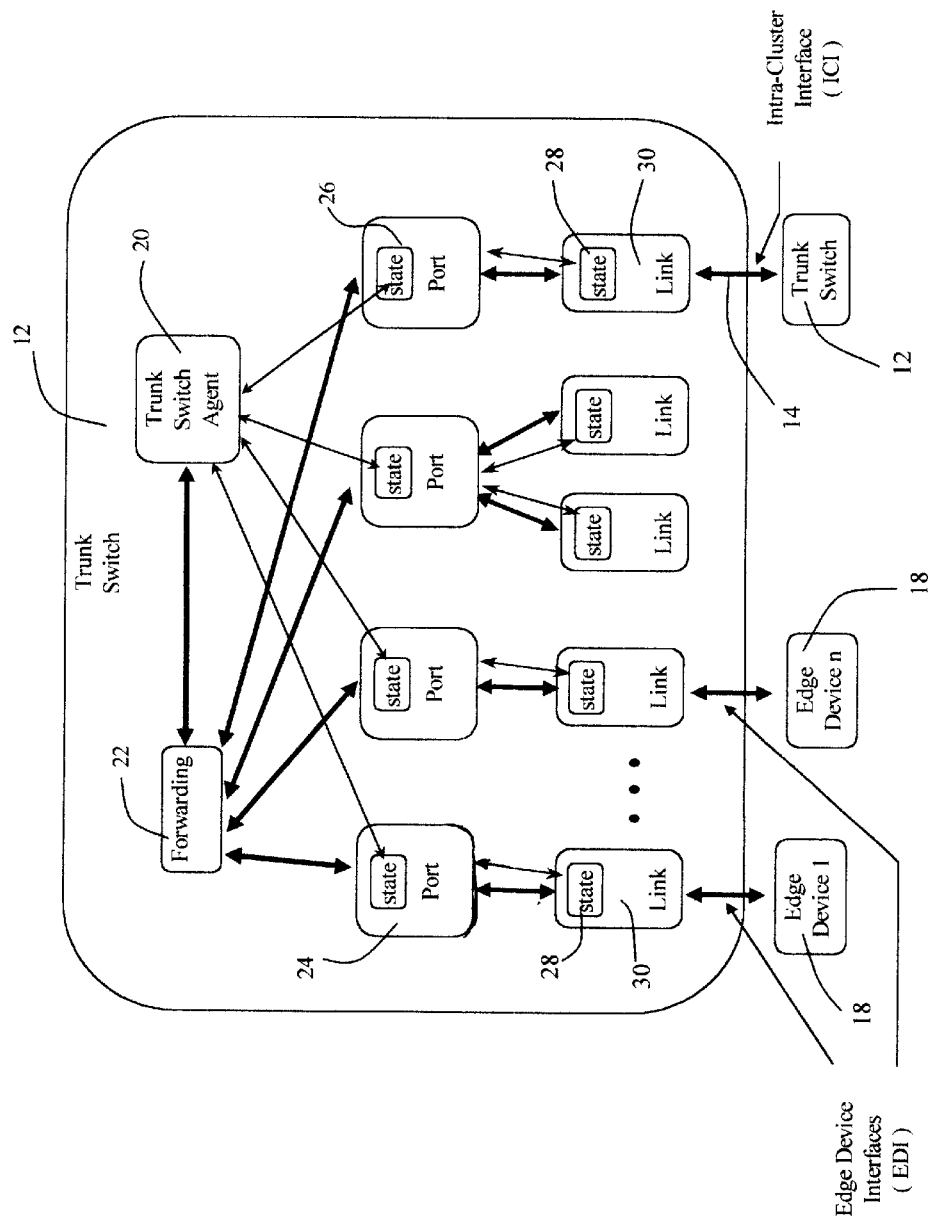
FIG. 2 is a schematic diagram showing a trunk switch of a trunk cluster with connections to edge edges.

Referring to the drawings in particular, the invention comprises a packet based high-speed communications mesh. The mesh is referred to herein as a trunk cluster. The trunk cluster utilizes a trunk configuration protocol process, which can quickly remove a trunk switch from the configuration after a failure of direct connectively to an edge device.

FIG. 1 shows the direct connectivity between the elements of the high-speed mesh which is referred to herein as a trunk cluster 10. Different trunk clusters may also be connected. Three types of interfaces may be present. The first interface is a direct physical connection of each switch 12 of one trunk cluster to each switch of another trunk cluster to provide interconnected trunk clusters (two or more interconnected trunk clusters as described in U.S. application Ser. No. 09/060,606 of Apr. 15, 1998). An intra-cluster interface (ICI) 14 is provided which includes one or more links that connect a trunk switch 12 of the trunk cluster 10 with another trunk switch 12 of the trunk cluster 10. An edge device interface (EDI) 16 is provided which includes one or more links that connect an edge device 18 to a trunk switch 12.

The invention provides that a reliable load sharing system is implemented which works along with the trunk configuration management protocol. The reliable load sharing system is based on a trunk switch agent 20 associated with each trunk switch 12. The trunk switch agent 20 receives and transmits trunking protocol packets for the trunk switch 12. The trunk switch agent can support multiple different protocols. Existing protocols include the LAN level 2 spanning tree protocol as well as level 3 protocols such as the TCMP mentioned above, GMRP (for multicast applications) and RLP (a router to router protocol). The nature of such of a protocol is discussed in more detail in the patent applications which have been incorporated by reference. Each edge device 18 combines a set of two or more physical links into a logical aggregate link or trunk. At least one link goes to each trunk switch 12. During operation, the various edge devices 18 transmit payload data and trunk configuration protocol packets out each physical link in the trunk. Each trunk switch receives and retransmits the data packets using a standard process known as bridge forwarding. The trunk agent receives and transmits the trunking protocol packets for the trunk switch as indicated at forwarding functional block 22.

The trunk switch agent 20 also monitors the link status for the various links connecting to ports 24 of the switch 12. This is shown by functional blocks 26, which provide information as to the state of the ports 24 and functional blocks 28 which provide information as to the state of the various links 30.

Figure 3:
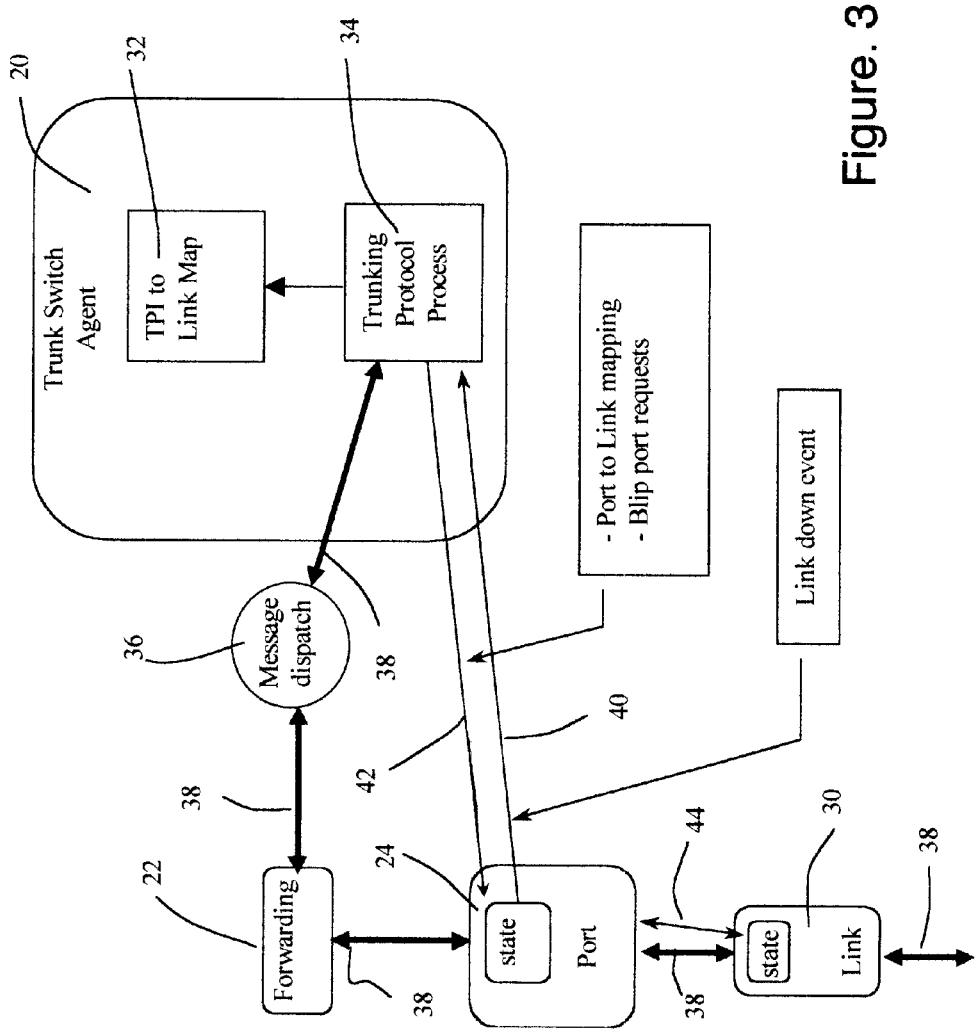
FIG. 3 is a schematic diagram illustrating a process of controlling a trunk cluster using a trunk switch agent.

In addition to receiving and transmitting all trunking protocol packets for the trunk switch and monitoring the link status, the switch agent 20 also maintains a table, which indicates the association of each edge device to a particular link. That is, identifiers are provided that uniquely define each edge device. The identifier is called a trunk port identifier (TPI). The switch agent 20 builds up a list of the association between the various TPI's and the links to provide a link to trunked port ID mapping table 32 which is shown in FIG. 3. The mapping table 32 is built up by monitoring the trunk configuration protocol packets that are transmitted by the edge devices during normal operation using the trunk configuration protocol process 34. The process 34 can include the TCMP as noted above.

In FIG. 3, the trunk protocol process is illustrated schematically and the quicker blipping process according to the invention is also illustrated. The darker connection lines indicate the ongoing trunk configuration process protocol process 34. This can involve for example the trunk switch agent 20 transmitting trunking protocol packets for the trunk switch to the edge devices 18 via edge device interfaces 16. This is functionally shown at message dispatch block 36 and forwarding block 22. As noted above, the various edge devices are also transmitting and receiving trunk configuration protocol packets. The trunking protocol process, in particular the transmission and reception of the trunk configuration protocol fry packets, is shown schematically by interconnections 38. The blipping process is also part of the trunking protocol process 34 according to the invention. This is illustrated by connections 40 and 42. At 40 the trunking protocol process 34 is shown to be monitoring the link status arid at 40 the trunking protocol process 34 may issue a port blip request (described below) A connection, which is part of the blipping portion of the trunking protocol process 34, is shown at 44, for bringing down the particular link and monitoring the state of the link 30. The status of the connection 44 between port 24 and link 30 is passed on to the trunking protocol process for establishing the TPI to link map 32.

During the ongoing trunking protocol process, which includes the transmission and reception of trunking protocol packets from and to the agent 20 and the transmission of trunk configuration protocol packets from the edge devices 18, the TPI to link map 32 is established and maintained. The TPI to link information is based on the TPI which is a unique identifier of one or more links that make up the direct connection to a particular edge device 18.

Upon detecting a failure of direct connectivity to an edge device the trunking protocol process 34 brings down all links to edge devices of particular trunk switch such as the various links 30 of trunk switch 12. However, this blipping action only occurs when it has been ascertained that it is necessary to remove the trunk switch 12 from the trunk cluster 10. According to the invention, the trunk switch 12 needs to be removed when the trunk switch 12 loses all of its links to a particular edge device 18 and the other trunk switch of the trunk cluster 10 still has at least one link 30 to the particular edge device 18. When blipping occurs, namely when all links to edge devices on the particular trunk switch 12 are temporarily brought down, the edge devices 18 are signaled to stop sending packets to the particular trunk switch 12. This results in the edge devices only using the remaining other switch(es) such that network disruption is minimized. The port blipping process feature of the overall trunking protocol process is much faster than the trunk configuration protocol because it relies on the high-speed link down indications from the link hardware. Specifically, the edge devices upon noticing a link down indication quickly shift to one of the other switches of the trunk cluster.

The hardware that runs the links sends out very frequent signals back and forth to monitor the state of the link. For example, this is a standard feature of 100 Mb and 1000 Mb Ethernet as specified by the IEEE. Once the hardware on either end detects a link failure it sends a signal to its associated software. Usually the signal is in the form of an interrupt or other relatively high-speed means. In this case this associated software on the edge devices will inform the trunking software, which then stops using the link.

When the particular trunk switch 12 turns its links back on at the end of the port blipping process the edge devices 18 are signaled to start sending trunk configuration protocol packets again. Once the protocol determines that the particular trunk switch 12 has a connection to the same edge devices as the remaining trunk switch(es), then the edge devices 18 will start sending payload data packets to the trunk switch. A TPI timer is provided to delay blipping the ports. When a trunk switch agent detects the loss of the connection with an edge device it needs to determine if the other trunk switch agent still has a connection. So it sends a lost TPI message to the other agent. The other trunk switch responds with a "lost TPI response". If the response indicates that the other trunk switch still has a connection, then the trunk switch agent will plan to blip the ports once the TPI timer expires. The trunk switch agent doesn't blip the ports immediately upon receiving the response, because the other switch may lose the connection to the edge device slightly later than the trunk switch. The trunking protocol process continually executes the following algorithm:

```
When a link down event occurs
    Update TPI to Link map
    Look in TPI to Link map to see if there are any
        remaining links to that TPI
    If no more links remaining and no TPI timer posted
        then
        Send a lost TPI message to other Trunk Switch(es)
        Post a timer to wait for status from other Trunk
            Switch(es)
    End if
End when
When a lost TPI message is received
    Respond with this switches status for the lost TPI
    If a timer is posted for a TPI then
        Cancel timer posted for the TPI
    End if
End when
When the timer for a TPI has expired
    If a lost TPI response has been received and the other
        switch has still has connectivity to the TPI then #Run
        Procedure BlipPortsOff( )
    End if
End when
When the Timer for BlipPortsOff has expired
    Run Procedure BlipPortsOn( )
End when
Procedure BlipPortsOff( )
    Set aTimer for BlipPortsOff
    For Each Link to an edge device
        Turn off Link
    End For
End Procedure
Procedure BlipPortsOn( )
    For each link to an edge device
        Turn on link
    End for
End procedure
```

The process allows for quick reaction time whereby a switch can be effectively removed from a trunk cluster quickly after a failure of direct connectivity to an edge device. The edge devices quickly respond to the blipping procedure, the bringing down of a link based on the high-speed link down indications from the link control hardware. The process guarantees that the trunk switch is only removed when all connectivity to an edge device is lost and the other trunk switch of the trunk cluster has at least one link to the edge device.

While specific embodiments of the invention have been shown and described in detail to illustrate the application of the principles of the invention, it will be understood that the invention may be embodied otherwise without departing from such principles.

What is claimed is:

1. A packet based high-speed communications mesh, comprising:
   a plurality of trunk switches;
   trunked network interfaces including links connecting said trunk switches to form a trunk cluster;
   edge devices connected to said trunk cluster via trunked links, said trunked links providing a physical connection from each trunk switch to each edge device;

a trunk switch agent for
monitoring link status of links of a trunk switch connected to edge devices and/or another trunk switch,
building an identifier list, said identifier list providing a map of a unique identifier, identifying a connected edge device and the associated link of the trunk switch,
updating said identifier list so as to indicate that a particular edge device corresponding to a trunk port ID no longer is associated with a particular link of a particular trunk switch,
checking the identifier list to determine if any other remaining links are associated with the particular edge device of the trunk port ID,
if no more links remain associated with the edge device for the particular trunk switch, sending a signal in the form of a message indicating the list of the particular edge device with the particular trunk port ID to other trunk switches in the trunk cluster have connectivity to the particular edge device;
upon receiving a response indicating a link exists between another trunk switch in the trunk cluster and the particular edge device, bringing down and then bringing back up all links of the particular switch whereby edge devices stop transmitting to the particular trunk switch and direct traffic of the particular edge device to the other trunk switches.

2. The high-speed communications mesh according to claim 1, further comprising:
a configuration protocol for configuring said trunk cluster by eliminating links connected to a trunk switch upon loss of connectivity to the trunk switch, said protocol including trunk configuration protocol packets transmitted by said edge devices;
wherein said switch agent receives and transmit all trunking protocol packets for the associated trunk switch and said identifier list is built upon monitoring trunk configuration protocol packets.

3. The high-speed communications mesh according to claim 1, wherein prior to bringing down all links of the particular switch a timer is set.

4. The high-speed communications mesh according to claim 1, wherein said message is sent to other trunk switches only if no timer is set.

5. The high-speed communications mesh according to claim 1, wherein upon receiving the message at a trunk switch, the trunk switch provides a response indicating the trunk switch status and if a timer is posted, the timer is cancelled.

6. A trunking protocol process for a trunk cluster including a plurality of trunk switches, a link between each trunk switch and each other trunk switch, each trunk switch having a plurality of ports and links connected to interfaces of a plurality of edge devices, each edge device having a unique trunk port identifier, the process comprising the steps of:
transmitting trunk configuration protocol packets to the trunk switches from the edge devices;
providing an agent at each trunk switch for receiving and transmitting trunking protocol packets for a trunk switch, for monitoring link status of links of the trunk switch and for maintaining a trunk port identifier to link mapping table by monitoring trunk configuration protocol packets transmitted by said edge devices and for selectively bringing down all links to edge devices of one of the trunk switches when it is necessary to signal edge devices to stop sending data to said one of the trunk switches;
updating said trunk port identifier to link mapping table sa as to indicate that a particular edge device corresponding to a particular trunk port identifier no longer is associated with a particular link of a particular trunk switch;
checking the trunk port identifier to link mapping table to determine if any other remaining links are associated with the particular edge device of the particular trunk port identifier of the particular trunk switch;
if no more links remain from the particular switch to the particular edge device, sending a lost message indicating the loss of the particular edge device of the particular trunk port identifier to other switches of the trunk cluster;
upon receiving a response to the lost message that another trunk switch of the trunk cluster has at least one link to the particular edge device, bringing down all links on the particular trunk switch whereby other edge devices observe the bringing down of all links of the particular trunk switches that lost all its links to the particular edge device and direct traffic for the particular edge device to other trunk switches.

7. The process according to claim 6, wherein prior to bringing down all said links on said one of the trunk switches a timer is set.

8. The process according to claim 7, wherein said lost message is sent to other trunk switches only if no timer is set.

9. The process according to claim 7, wherein upon receiving the lost message at one of the other trunk switches, the one of the other trunk switches provides the response indicating the switch status and if a timer is set, the timer is cancelled.

10. A packet based high-speed communications mesh, comprising:
a plurality of switches;
trunked links connecting each of said switches to an edge device, said trunked links providing a physical connection from each switch to each edge device;
an identifier list for each switch, each identifier list providing a map of a unique trunk port ID identifying a connected edge device and the associated link of each trunk switch;
a trunk switch agent for monitoring link status of links of the trunk switch which are connected to edge devices and/or another trunk switch, updating said identifier list so as to indicate any edge device corresponding to a trunk port ID no longer associated with a particular link, checking the identifier list to determine if any other remaining links ate associated with the edge device of the trunk port ID and issuing a request to bring down all links to edge devices of one of said trunk switches upon all links to a particular edge device of said one of said trunk switches being lost and another trunk switch of said trunk cluster having at least one link to said particular edge device, whereby edge devices stop transmitting to said one of said trunk switches upon said agent bringing down all links to edge devices of said one of said trunk switches.

* * * * *